(12) United States Patent
Burns et al.

(10) Patent No.: US 10,926,212 B2
(45) Date of Patent: Feb. 23, 2021

(54) RADIAL FLOW ADSORBER VESSEL FOR GAS SEPARATION

(71) Applicant: Pacific Consolidated Industries, LLC, Riverside, CA (US)

(72) Inventors: Jason Burns, Lake Oswego, OR (US); Paul Joseph Helterline, Anaheim, CA (US); Tarik Naheiri, Dana Point, CA (US); Steven Wilson Schellhase, Los Angeles, CA (US)

(73) Assignee: Pacific Consolidated Industries, LLC, Riverside, CA (US)

( * ) Notice: Subject to any disclaimer, the term of this patent is extended or adjusted under 35 U.S.C. 154(b) by 355 days.

(21) Appl. No.: 15/850,324

(22) Filed: Dec. 21, 2017

(65) Prior Publication Data

US 2018/0169566 A1    Jun. 21, 2018

Related U.S. Application Data

(60) Provisional application No. 62/437,207, filed on Dec. 21, 2016.

(51) Int. Cl.
| | | |
|---|---|---|
| *B01D 53/02* | (2006.01) | |
| *B01D 53/04* | (2006.01) | |
| *B01D 53/047* | (2006.01) | |
| *C10G 70/00* | (2006.01) | |

(52) U.S. Cl.
CPC ....... *B01D 53/0431* (2013.01); *B01D 53/047* (2013.01); *B01D 53/0415* (2013.01); *C10G 70/00* (2013.01); *B01D 53/0476* (2013.01); *B01D 2253/104* (2013.01); *B01D 2253/108* (2013.01); *B01D 2256/12* (2013.01); *B01D 2259/402* (2013.01); *B01D 2259/4146* (2013.01)

(58) Field of Classification Search
CPC ........ B01D 2253/104; B01D 2253/108; B01D 2256/12; B01D 2259/402; B01D 2259/4146; B01D 53/0415; B01D 53/0431; B01D 53/047; B01D 53/0476; C10G 70/00

See application file for complete search history.

(56) References Cited

U.S. PATENT DOCUMENTS

| | | |
|---|---|---|
| 5,807,422 A | 9/1998 | Grgich |
| 6,506,234 B1 | 1/2003 | Ackley |
| 7,097,768 B2 | 8/2006 | Talbot |
| 2006/0236867 A1 | 10/2006 | Neary |

(Continued)

*Primary Examiner* — Christopher P Jones
(74) *Attorney, Agent, or Firm* — Heisler & Associates

(57) ABSTRACT

The adsorber vessel is configured for radial flow between a center column and a perimeter manifold. Space between the center column and the perimeter manifold contains adsorption media. End caps close off ends of the vessel. An inlet and an outlet are configured within one of the end caps to feed starting gas into the center column or perimeter manifold, and to draw off product gas from the perimeter manifold or center column. An end cap can be removed to provide access for media loading between the center column and the perimeter manifold. Media is preferably provided within cartridges which can slide into this media space. Cartridges can be concentric with one cartridge inboard of the other, or can be stacked vertically. A spring plate can be provided on an open end to hold the media in position, while sealing the open end of the adsorber vessel.

20 Claims, 2 Drawing Sheets

(56) References Cited

U.S. PATENT DOCUMENTS

| | | |
|---|---|---|
| 2012/0055862 A1 | 3/2012 | Parekh |
| 2012/0090470 A1* | 4/2012 | McKenna .......... B01D 53/0415 96/147 |
| 2016/0059176 A1 | 3/2016 | Chandran et al. |

* cited by examiner

RADIAL FLOW ADSORBER VESSEL FOR GAS SEPARATION

CROSS-REFERENCE TO RELATED APPLICATIONS

This application claims benefit under Title 35, United States Code § 119(e) of U.S. Provisional Application No. 62/437,207 filed on Dec. 21, 2016.

FIELD OF THE INVENTION

The following invention relates to adsorption based gas separation, such as vacuum swing adsorption or pressure swing adsorption, and especially air separation for production of oxygen. More particularly, this invention relates to adsorber vessel configurations for use within adsorption based gas separation systems, and especially vessels which accommodate radial flow between a hollow center column and a perimeter manifold.

BACKGROUND OF THE INVENTION

Oxygen production from air, and other gas separations can occur by use of an appropriate adsorber material which selectively adsorbs certain gas constituents, so that a separation of constituents within the gas can occur. Typically, such adsorber material is contained within vessels which include an inlet and an outlet arranged in various ways associated with the vessel. Air (or other gas to be separated) is fed into the inlet and oxygen (or other product gas) is produced from an outlet relative to that vessel.

This invention is directed to optimizations relating to the adsorber vessel. Prior art associated with this invention includes radial flow adsorber vessels such as those disclosed in U.S. Pat. Nos. 4,541,857 and 5,814,129. Furthermore, U.S. Pat. No. 8,496,738 is illustrative of a system for such gas separation utilizing adsorber material within the vessel, and this patent is incorporated herein by reference in its entirety.

A need exists for adsorber vessels which are of a radial flow variety and which are easier to manufacture, and which can potentially be formed in a modular fashion to flexibly allow for vessels of different capacities, especially within single bed reversing blower (SBRB) adsorption systems. Also, adsorber media size and dimensions of the vessel itself or modular portions of the vessel can be optimized to adjust system capacity and/or to maximize efficiency and otherwise improve the process, according to details of the invention provided herein below.

SUMMARY OF THE INVENTION

With this invention a series of improvements to prior art radial flow adsorber vessel designs are described. As one beneficial feature of this invention, the adsorber vessel is configured with separate subparts which slide together in a simple fashion, which can be convenient for matching different internal characteristics of the adsorber vessel with optimal design parameters, so that a customized or semi-customized vessel design can be accomplished in a simple fashion. The vessel has multiple parts but can be generally considered to include three major subparts. An outer containment wall provides a first subpart. Inner containment structures provide a second subpart. Adsorption media provides a third subpart.

The outer containment wall comprising the first subpart generally has three components including a lower end cap, an upper end cap and a cylindrical side wall. These components are all designed to have a desired strength so that they can withstand the vacuum (or pressure if used in pressure swing adsorption variations of the system) which will be encountered according to the design of the system. Typically the lower end cap includes inlet and outlet structures passing therethrough (although in alternative designs the inlet and/or outlet could be in the upper end cap). This lower end cap is preferably generally semi-spherical, or semi-ellipsoidal in form with holes and plumbing passing therethrough to accommodate the inlet and outlet.

A perimeter edge of this lower end cap preferably has a diameter similar to that of the cylindrical side wall. Generally, the lower end cap can be considered to be at a lower end with the cylindrical side wall extending up from the lower end cap. However, the orientation of the vessel could be altered, so that the lower end cap is not necessarily at a lower side, but the entire vessel could be oriented sideways or inverted relative to the orientation discussed herein.

This cylindrical side wall extends up to an upper edge. An upper end cap then attaches to the upper edge of the cylindrical side wall. Most preferably, the lower end cap and cylindrical side wall are permanently coupled together, such as by welding or by bolting together through flanges in a more permanent fashion. However, the upper end cap is preferably attached to the cylindrical side wall in a manner which facilitates removal of the upper end cap from the cylindrical side wall. Such removability could be through the removal of bolts passing through flanges, or by making the upper end cap with a cylindrical flange which merely nests within an upper end of the cylindrical side wall, since pressure differentials involve greater pressure outside of the pressure vessel than inside the pressure vessel, these pressures tend to keep the end cap with such a cylindrical flange tightly nested within the upper end of the cylindrical side wall. Appropriate seals can also be provided. This upper end cap is removable so that an interior of the vessel can be fully accessed during manufacture and potentially also thereafter.

Inner containment structures within the vessel provide a second major subpart of the overall vessel configuration. These inner containment structures are preferably configured to slide into the cylindrical side wall of the vessel in a linear vertical downward direction for installation of these inner containment structures. These inner containment structures, in a simplest embodiment, merely include a gas permeable cylindrical center column aligned with an inlet (or outlet) in the lower end cap, and a gas permeable outer perimeter wall inboard of the cylindrical side wall of the vessel itself and adjacent to a perimeter manifold which can feed to the outlet (or inlet).

A final component of the adsorber vessel is in the form of adsorption media which can then be placed between the cylindrical center column and the perimeter wall. These gas permeable walls of the inner containment structures generally also include an upper spring plate which is of annular form and capped over a space between the cylindrical center column and the outer cylindrical walls, which gas permeable walls bound the adsorber media space, so that this annular spring plate completes the enclosure for the adsorber material. Preferably, springs are interposed above this spring plate and structures coupled to the upper end cap, so that these springs keep the flow dividing structures and/or adsorber media held firmly in place within the outer containment structure of the vessel, and accommodate some variation in height of the inner containment structures.

In more complex forms of the invention it is desirable to have two stage adsorber material with a first stage being provided in a form such as an alumina media material, such as in the form of spherical (or other shape) beads, and a second adsorber material in the form of molecular sieve material, generally also in the form of spherical beads. The alumina would be provided in a cylindrical column adjacent to the central inlet manifold and the molecular sieve material would be provided in an outer cylinder outboard of the alumina cylinder and inboard of the perimeter manifold. This arrangement with the alumina adjacent the central inlet would be reversed if the system were configured for radial inward flow rather than radial outward flow.

In one embodiment a coco mat (or other gas permeable membrane) is provided at a dividing line between the alumina space and the molecular sieve space to keep the alumina and molecular sieve separate. The spring plate can cap both the molecular sieve space and the alumina space at the upper end thereof. Inner and outer cylindrical internal membranes are (in one embodiment) provided in the form of perforated felt mesh with a size sufficiently small to keep the alumina and/or molecular sieve media from migrating out of the cylindrical columns where they are desired to be kept. This perforated mesh or other membrane has sufficiently large openings to maximize flow therethrough without resistance, while keeping the media in a desired position.

This configuration for the vessel is advantageous in that details such as an amount of alumina and an amount of molecular sieve material can be adjusted without affecting design of the outer containment wall or the spring plate. Furthermore, other portions of the inner containment structure, such as the perforated mesh, would in many designs remain the same, but the coco mat could change in diameter, for instance to accommodate a greater or lesser amount of alumina relative to molecular sieve material. In such a manner, optimal design of an adsorber vessel can be provided for each installation, rather than having customers need to settle for a suboptimal design because of the complexity associated with customizing an adsorber vessel.

After initial manufacture, such drop in configuration for the components within the adsorber vessel allows for repurposing of the adsorber vessel should operational objectives change, and also allows for maintenance, or replacement of alumina and/or molecular sieve material, and also allows for convenient inspection.

In one embodiment of the invention, the outer containment structure of the vessel stays approximately the same, but the inner containment structures and adsorption media are modularized. Modular packs are provided which include the cylindrical membranes for adsorption media, each potentially preloaded (or not preloaded) with adsorption material, such as for instance a combination of alumina and molecular sieve material with a coco mat divider barrier. These separate modular sections preferably each have a similar shape and size which has a diameter similar to an overall diameter usable within the outer containment wall, but with a height which is some fraction of an available height within the vessel. For instance, the interior of the vessel could be broken into a lower, middle and upper portion with modular components of a similar shape, one of which can be placed in the lower region, one placed in a middle region and one placed in an upper region, each being one-third the height of the vessel.

Such modularity further facilitates customization and rapid construction and modification of adsorber vessels for convenience both in manufacturing, and also should modification of an existing adsorber vessel be desired, and also facilitates easier handling of the adsorber material in that it is contained within smaller modular components. The individual modular components preferably nest together somewhat at their interfaces so that they can conveniently hold each other in position. A perforated felt mesh is typically provided at upper and/or lower portions of such modular components to contain the adsorber material therein. Such perforated felt mesh is oriented in an annular manner perpendicular to a central axis of the adsorber vessel so that this perforated felt mesh does not oppose the generally radial flow within the adsorber vessel. While this perforated felt mesh could be replaced with a solid and impervious structure, the adsorber vessel generally benefits from facilitating the ability for gas to flow somewhat lateral to a primary radial flow direction, so that pressure drops within the vessel and adsorber media within the vessel are most uniformly utilized.

Research of the applicant has shown that various adsorber bed design parameters can be adjusted to provide optimal performance. Typical parameters to be adjusted include molecular sieve material diameter, bed depth, superficial linear gas velocity (SLGV) and various geometric details of the adsorber vessel. Research has shown that a superficial linear gas velocity of between 5,000 and 7,500 feet per hour is optimal, at least for many single bed reversing blower (SBRB) systems. Goals such as oxygen production capacity (or other production gas) can be correlated with optimal superficial linear gas velocity to develop an adsorber vessel geometry of optimal configuration. With such design parameters selected for optimal performance, one can then construct an adsorber vessel utilizing the simple drop in of components, and potentially also the modularity of components, so that a relatively small number of separate vessel subcomponents can lead to a relatively large number of different designs, each optimized for the particular needs of a customer.

OBJECTS OF THE INVENTION

Accordingly, a primary object of the present invention is to provide a radial flow adsorber vessel which can be readily modified to optimize performance, such as by swapping out different types of media cartridges from within an interior of the adsorber vessel.

Another object of the present invention is to provide a radial flow adsorber vessel which can be easily manufactured from standardized parts including cartridges of adsorption media and still have optimal performance following a particular desired design.

Another object of the present invention is to provide a method for loading an adsorption vessel with adsorption media which is easy to perform and allows for flexible configuration of the adsorption system for optimal performance.

Another object of the present invention is to provide an adsorber vessel which can be tuned to particular design parameters without requiring customization of large portions of the adsorber vessel.

Another object of the present invention is to provide an adsorber vessel for an adsorption gas separation system which facilitates maintenance and/or performance modification after initial commissioning.

Another object of the present invention is to provide an adsorption vessel which efficiently utilizes a large percentage of available volume for adsorption during operation, for efficient space utilization and economical capital costs.

Other further objects of the present invention will become apparent from a careful reading of the included drawing figures, the claims and detailed description of the invention.

DESCRIPTION OF THE PREFERRED EMBODIMENT

Figure 3:
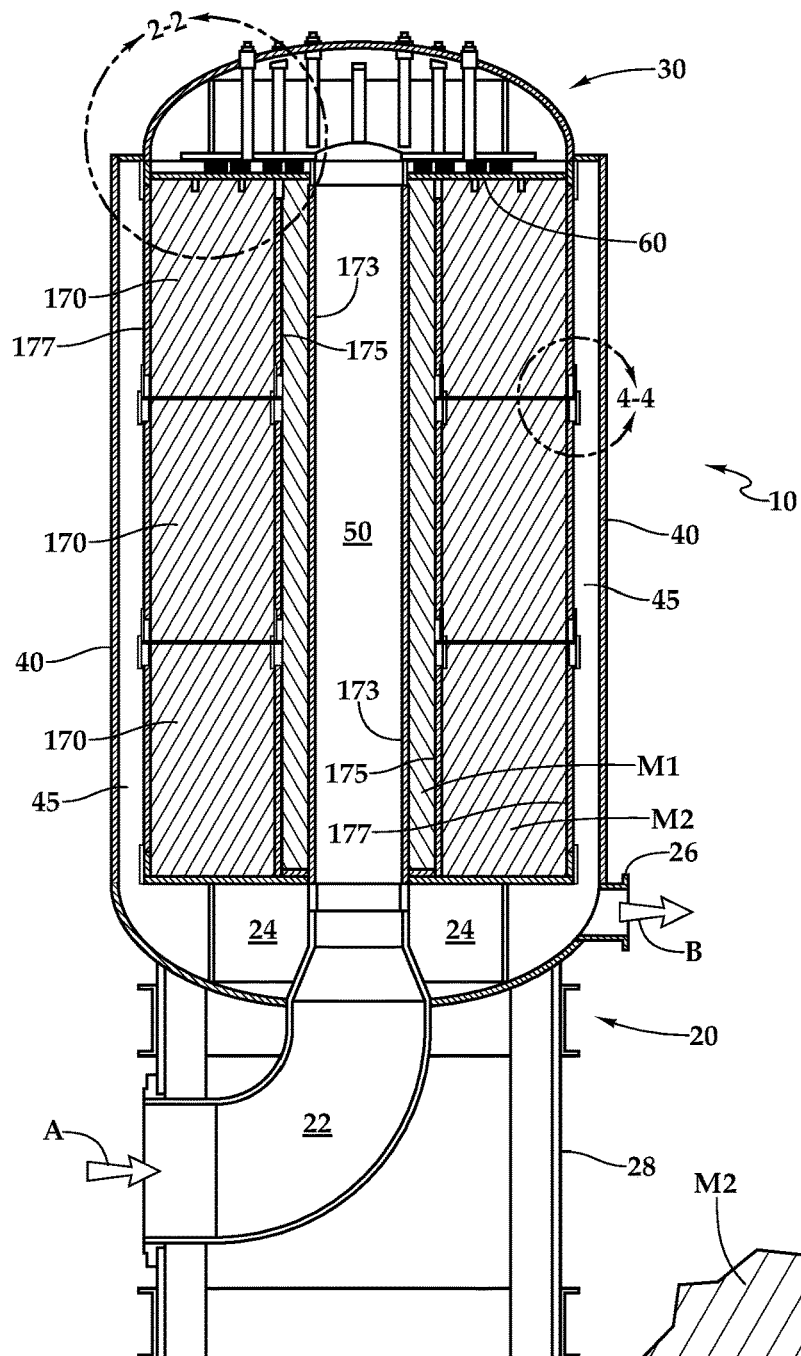
FIG. 3 is a front elevation full sectional view of an alternative embodiment of that which is shown in FIG. 1, with media cartridges of similar shape stacked vertically and with each cartridge featuring a divider which divides two different types of adsorption media contained within each cartridge.

Referring to the drawings, wherein like reference numerals represent like parts throughout the various drawing figures, reference numeral 10 (FIGS. 1 and 3) is directed to an adsorber vessel for use within a gas separation system operating on the principle of selective adsorption of various gases, such as a vacuum swing air separation system, and particularly a single bed system fed by a reversing blower. The vessel 10 is configured to be of a radial flow variety and to openable to have media cartridges slide therein, which in one embodiment include concentric media cartridges 70, 80 (FIG. 1) or in another embodiment include vertically stackable media cartridges 170 (FIG. 3).

Figures 1, 2:
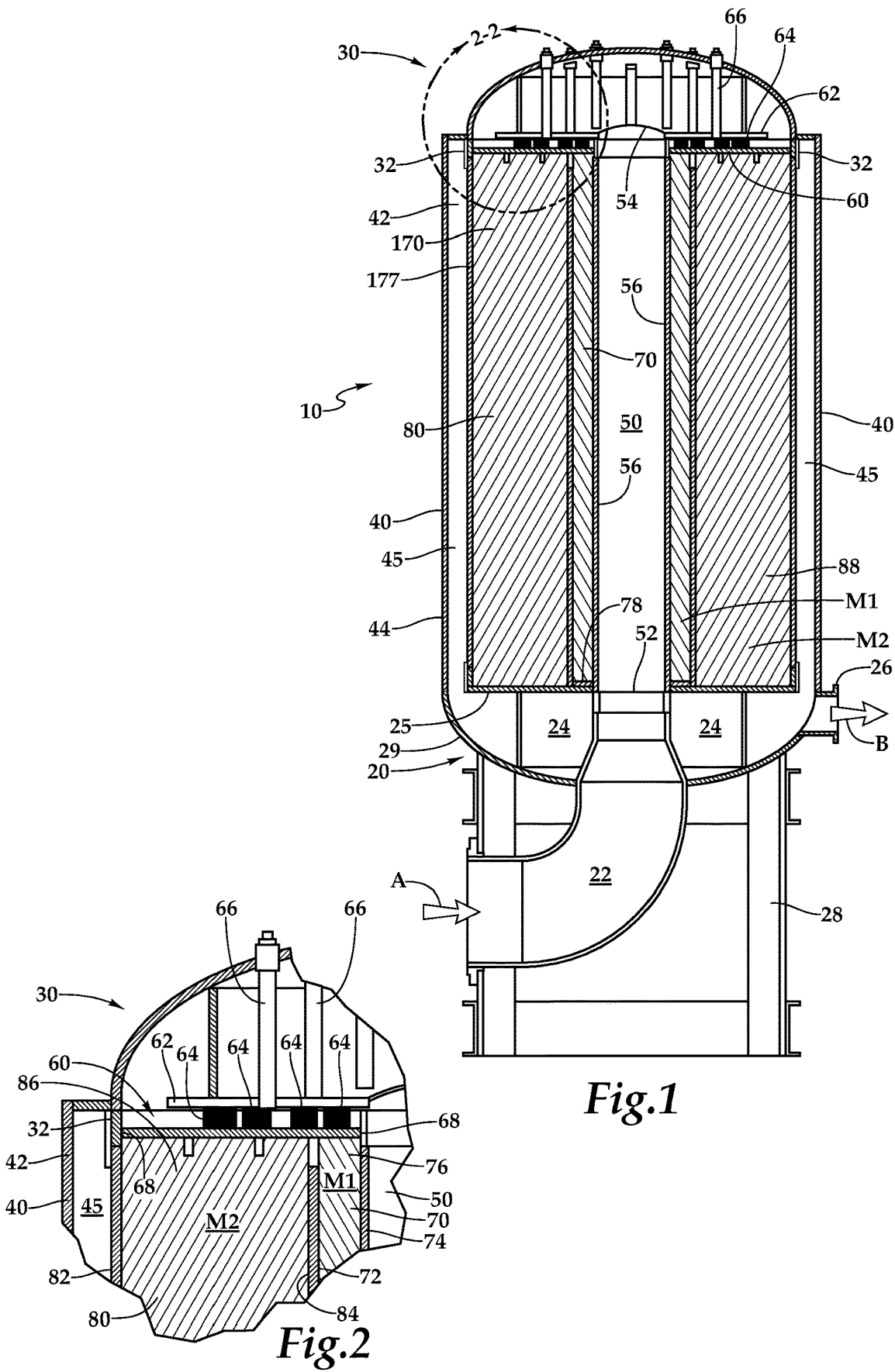
FIG. 1 is a front elevation full sectional view of an adsorption vessel according to a first embodiment with concentric adsorption media cartridges located therein.
FIG. 2 is a detail of a portion of that which is shown in FIG. 1 revealing details of how a spring plate seals off an openable end of the adsorber vessel and securely holds adsorption media therein.

In essence, and with particular reference to FIG. 1, basic details of the adsorber vessel 10 are described, according to an exemplary embodiment. The vessel 10 includes an outer enclosure formed of a lower end cap 20 opposite an upper end 30 and with a cylindrical sidewall 40 acting as an outer containment wall between the lower end cap 20 and the upper end cap 30. A hollow center column 50 extends vertically along a central axis of the vessel 10 and inboard of the cylindrical sidewall 40, preferably centered inboard of the cylindrical sidewall 40.

The center column 50 acts along with a perimeter manifold 45 to provide boundaries on either side of an adsorption media space for media M1, M2 which is preferably contained within cartridges, such as a first stage media cartridge 70 and a second stage media cartridge 80. These cartridges 70, 80 are concentric in this embodiment. Alternatively, stackable media cartridges 170 can be provided (FIG. 3) which are similar in form and include a divider wall 175 separating stage one media M1 from the stage two media M2. A spring plate 60 is preferably provided just below the upper end cap 30 and pressing against the upper ends of media cartridges 70, 80, 170 adjacent to the spring plate 60. The spring plate 60 is spring loaded to press down against the media M1, M2, holding it in place and closing off upper portions of a gas pathway between the center column 50 and the perimeter manifold 45.

More specifically, and with continuing reference to FIG. 1, particular details of the lower end cap 20 are described, according to a preferred embodiment. The lower end cap 20 is preferably radially symmetrical about a centerline aligned with the central axis and semi-spherical or semi-ovoid in form. The lower end cap 20 has a curving wall which is "concave up" and terminates at a perimeter lip 29. The lower end cap 20 rests upon a stand 28 which supports the lower end cap 20 above ground.

An inlet 22 passes through the lower end cap 20, preferably along a centerline thereof, to feed air or other source gas to be separated into the hollow center column 50. In alternative embodiments, this inlet 22 can be swapped with an outlet, so that the inlet 22 would actually be a discharge for product gas. An interior of the lower end cap 20 is largely formed of an outlet manifold 24 in fluid communication with the perimeter manifold 45 inboard of the cylindrical sidewall 40. An outlet conduit 26 leads from this outlet manifold 24, for discharge of product gas from the adsorber vessel 10 (e.g. oxygen being separated from air).

A lower retainer plate 25 is located within a horizontal plane generally aligned with the perimeter lip 29 and bounding an upper side of the outlet manifold 24. This lower retainer plate 25 acts as a lower support for cartridges 70, 80, 170 of media M1, M2 which are slid vertically downwardly about the hollow center column 50 until they abut the lower retainer plate 25 of the lower end cap 20. The lower retainer plate 25 can be supported in place by vertical plates which extend up from portions of the lower end 20. In one embodiment, these plates are actually a single cylindrical plate located approximately halfway between the inlet 22 and the perimeter lip 29. A volume of this outlet manifold 24 can be made larger or smaller, depending on how much "buffer space" is desired, by making such plates for supporting a lower retainer plate 25 positioned to increase or decrease a size of this outlet manifold 24 space within the lower end cap 20. The lower end 20 is described as that portion which supports the inlet 22 and the outlet conduit 26. Such an orientation could be reversed so that the inlet 22 and outlet conduit 26 could access the vessel 10 through the upper end cap 30, or the inlet 22 could be in the lower end cap 20 while the outlet conduit 26 could be in the upper end cap 30 (or vice versa). While the lower end 20 is described as being adjacent to the stand 28 and on a lower portion of the vessel 10, with this cylindrical side wall 40 extending vertically up from the lower end cap 20, as an alternative, the vessel 10 could be laying on its side or inverted, so that the lower end cap 20 is not necessarily at a lower portion of the vessel 10.

With continuing reference to FIG. 1, details of the upper end cap 30 are described, according to this exemplary embodiment. The upper end cap 30 is preferably similar to the lower end cap 20, except that it is inverted so that a perimeter flange 32 similar to the perimeter lip 29 extends downwardly from the upper end cap 30, generally aligned with this cylindrical side wall 40. The upper end cap 30 is preferably openable to allow for cartridges 70, 80, 170 of media M1, M2 to be slid down into the vessel 10 when the upper end cap 30 is removed. The upper end cap 30 also preferably supports posts 66 which help in the positioning of the spring plate 60, described in detail below. While the upper end cap 30 as well as lower end cap 20 are described as being semi-spherical or ovoid, so that the overall vessel 10 can have a generally cylindrical form with rounded ends, the vessel 10 could conceivably have other cross-sectional shapes and forms, and still accommodate many if not all of the distinctive features of this invention.

With continuing reference to FIG. 1, details of the cylindrical side wall 40 are described, according to this exemplary embodiment. The cylindrical sidewall 40 is preferably formed of a similar material from which the lower end cap 20 and upper end cap 30 are formed, which is typically a steel having sufficiently high strength and wall thickness to allow for resisting forces associated with a pressure differential matching atmospheric pressure on an exterior of the vessel 10 and total vacuum on an interior of the vessel 10. Material from which the cylindrical side wall 40 is formed, and typically also the end caps 20, 30 is typically also selected to be non-reactive with the product gas, such as to be non-reactive with gaseous oxygen. As an alternative, this cylindrical sidewall 40 can be coated to prevent oxidation.

This cylindrical sidewall 40 extends from an upper end 42 adjacent to the upper end cap 30 down to a lower rim 44 adjacent to the lower end cap 20. Most preferably, the cylindrical sidewall 40 is cylindrical in form so that the upper rim 42 has a circular form and the lower rim 44 has a circular form. In alternative embodiments the sidewall 40 could have a shape other than cylindrical, such as with a square cross-section or rectangular cross-section. The perimeter manifold 45 is preferably just inside of the cylindrical sidewall 40 and defines a region where product gas is collected after passing through the adsorption media M1, M2.

With continuing reference to FIG. 1, details of the hollow center column 50 are described, according to this exemplary embodiment. The center column 50 extends vertically along a central axis of the vessel 10 and preferably has a cylindrical form (although it could have a cross-section other than circular) and extends up from the lower retainer plate 25 to a distal end 54 opposite the entry 52 adjacent to the lower retainer plate 25. The center column 50 features a cylindrical entrance wall 56 on lateral sides thereof which is gas permeable. In one embodiment, this cylindrical sidewall is formed of a rigid perforated plate for structural support which also supports a felt layer adjacent thereto. The felt layer allows gas to pass through but prevents media, such as stage one media M1, from escaping into the center column 50. Any form of perforated plate could effectively be utilized, provided that the perforations are smaller and the media beads. As an alternative, this structure could be formed by a screen. The center column 50 is preferably structural to at least support its own weight and resist forces exerted upon it by cartridges 70, 80, 170, but could be supported primarily by the end caps 20, 30 and have little or no structure. Furthermore, to prevent the center column 50 from collapsing in on itself, center column 50 could include struts extending laterally therein to support the cylindrical entrance wall 56 in a desired position.

With continuing reference to FIG. 1, as well as with reference to FIG. 2, details of the spring plate 60 are described, according to this exemplary embodiment. The spring plate 60 includes the reference plate 62 fixed above the spring plate 60. The reference plate 62 is supported by support posts 66 extending down from the upper end cap 30. Springs 64 extend between the reference plate 62 and the spring plate 60. The spring plate 60 is biased downwardly by the springs 64 away from the reference plate 62. While springs 64 are preferably provided as a biasing element, other structures, such as a resilient mass of rubber or other resilient material, could alternatively be utilized. It is also conceivable that pressurized gas could bias the spring plate 60 away from the reference plate 62 in one form of spring plate 60 for this invention.

The spring plate 60 preferably has a flat annular form with a central hole similar in size to the center column 50, and with an outer perimeter having a diameter similar to that of the perimeter flange 32 of the upper end cap 30. Portions of the perimeter flange 32 of the upper end cap 30, or just parts of the upper end cap 30 adjacent to the perimeter flange 32, or portions of the upper rim 42 of the cylindrical sidewall 40 or portions of the cylindrical side wall 40 adjacent to the upper rim 42 are preferably oriented vertically and with a diameter (or other size and shape) closely matching that of the outer perimeter of the spring plate 60.

A seal 68 is preferably carried by this outer edge of the spring plate 60 which can ride against the adjacent surface formed within the upper end cap 30 (or adjacent structures) and thus maintain a tight seal as the spring plate 60 moves vertically. In this way, gases are prevented from migrating around the spring plate 60 and up into the upper end cap 30, while the spring plate 60 can also slide down and hold the media in place. Thus, the gas passing through the media M1, M2 is confined to the media space between the center column 50 and the perimeter manifold 45. Spring plate 60 also allows for media cartridges 70, 80 to slightly vary in capacity and not affect performance of the vessel 10, in that the spring plate 60 presses against the media cartridges 70, 80 to make their height generally uniform.

With continuing reference to FIG. 1, details of the first media cartridge 70 and the second media cartridge 80 are described, according to this exemplary embodiment. In this embodiment, the media is preferably contained within cartridges and can be readily dropped into the vessel 10, by sliding down parallel to the central axis around the center column 50 between the perimeter manifold 45 and the center column 50. The first stage media cartridge 70 is located adjacent to the center column 50. The second stage media cartridge 80 is located adjacent to the perimeter manifold 45. Each of the media cartridges 70, 80 are concentric in form with the first stage media cartridge 70 nested inboard of the second stage media cartridge 80. In one embodiment, the first stage media cartridge 70 contains alumina, while the second stage media cartridge 80 contains molecular sieve material.

The first stage media cartridge 70 includes an outer wall 72 opposite an inner wall 74 which define a radial distance that the first stage media cartridge 70 extends away from the center column 50. This first stage media cartridge 70 also includes an upper side 76 opposite a lower side 78. Most preferably the outer wall 72 is formed by a coco mat and acts as a divider to keep the first stage media M1 within the first stage media cartridge 70. The inner wall 74 is perfectly formed of perforated felt mesh and is located adjacent to the center column 50 and keeps the first stage media M1 within the first stage media cartridge 70 rather than spilling into the center column 50.

The upper side 76 and lower side 78 can be uncontained or merely contained by some mesh material with apertures small enough to keep the first stage media M1 contained therein. While a single first stage media cartridge is depicted (FIG. 1) extending all the way from the lower retainer plate 25 up to the spring plate 60, it is conceivable that multiple separate similar first stage media cartridges 70 could be stacked together to provide full height between the lower retainer plate 25 and spring plate 60. For instance, three such first stage media cartridges, each having one-third of the height of the first stage media cartridge 70 depicted in FIG. 1, could be stacked together adjacent to the center column 50.

The second stage media cartridge 80 is located outboard of the first stage media cartridge 70 between an outer wall 82 opposite an inner wall 84. The inner wall 84 is located adjacent to the first stage media cartridge 70, and is typically formed of the coco mat material to act as a divider wall between the first stage media cartridge 70 and the second stage media cartridge 80, and to keep the first stage media M1 separate from the second stage media M2. The second stage media cartridge 80 also includes an upper side 86 opposite a lower side 88. The outer wall 82 is preferably formed of perforated felt mesh and is adjacent to the perimeter manifold 45. The second stage media cartridge 80 is shown as a single cartridge, but could have multiple similar cartridges which would be stacked vertically between the lower retainer plate 25 and the spring plate 60. The upper side 86 and lower side 88 can be uncontained or merely provided with a mesh that keeps the second stage media M2 contained within the second stage media cartridge 80.

With particular reference to FIG. 3, an alternative embodiment is depicted where stackable media cartridges 170 are provided. The stackable media cartridges 170 are in one embodiment provided with a somewhat toroidal shape and with two compartments contained therein, one for first stage media M1 adjacent to the center column 50, and one for second stage media M2 adjacent to the perimeter manifold 45. In an exemplary embodiment, the stackable media cartridges 170 have a height less than the distance between the lower retainer plate 25 (FIG. 1) and the spring plate 60.

Figure 4:
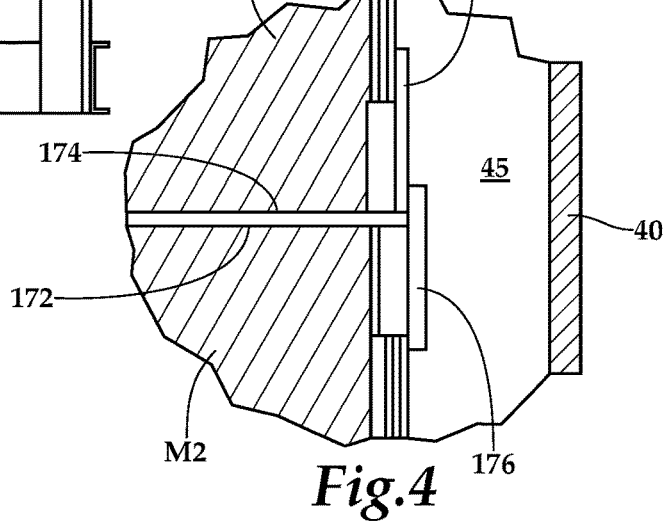
FIG. 4 is a detail of a portion of that which is shown in FIG. 3, revealing how adjacent cartridges are configured to nest together when each of the cartridges have a similar shape and size.

Each stackable media cartridge 170 includes a top wall 172 spaced from the bottom wall 174, and with this top wall 172 fitted with an upper joint 176, while the bottom wall 174 is filled with a lower joint 178 (see FIG. 4). The upper joint 176 is configured to mate with the lower joint 178. Each cartridge 170 has both an upper joint 176 and a lower joint 178, so that each cartridge 170 is similar and they can stack together with an upper joint 176 of a lower one of a pair of cartridges 170 joining with a lower joint 178 of an upper one of a pair of cartridges 170.

Each cartridge 170 also preferably includes an inside wall 173 adjacent to the center column 50, and outside wall 177 adjacent to the perimeter manifold 45, as well as a divider wall 175 between the inside wall 173 and the outside wall 177 and dividing the first stage media M1 from the second stage media M2. This divider wall 175 is perfectly formed of coco mat material, while the inside wall 173 and outside wall 177 are preferably formed from perforated felt mesh material.

The stackable media cartridges 170 are slid vertically (parallel with the central axis) downward about the center column 50, when the upper end cap 30 is removed, until the media space is filled. The upper end cap 30 is then put in place, and the spring plate 60 presses down on the stack of media cartridges 170. The media is thus held tight and gas flow space is limited to either the center column 50, perimeter manifold 45, or space contained by the stackable media cartridges 170 between the lower retainer plate 25 and the spring plate 60.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. An adsorber vessel for an adsorption based gas separation system, the vessel comprising in combination: an outer containment including a sidewall, and a pair of end caps on opposite ends of said side wall; a hollow center column inboard of said sidewall and extending at least partially between said pair of end caps; a perimeter manifold closer to said sidewall than to said hollow center column; a gas inlet coupled to one of said hollow center column or said perimeter manifold; a product gas outlet coupled to one of said perimeter manifold or said hollow center column; at least two adsorption media cartridges sized to slide parallel to a central axis of said center column and into a space between said center column and said perimeter manifold to fill at least a portion of space between said hollow center column and said perimeter manifold; wherein each of said cartridges includes a permeable outer wall and a permeable inner wall with adsorption media therebetween, said outer wall closer to said perimeter manifold than said inner wall; wherein each of said cartridges is cylindrical in form with said outer wall forming an outer surface of said cylindrical form and with said inner wall forming an inner surface of said cylindrical form, and wherein at least two adsorption media cartridges nest concentrically including a first inner cartridge and a second outer cartridge, said first inner cartridge nesting inboard of said second outer cartridge.

2. The vessel of claim 1 wherein both said first inner cartridge and said second outer cartridge extend over a majority of a height of said hollow center column.

3. The vessel of claim 1 wherein a perforated felt mesh is provided for said outer wall of said second outer cartridge and for said inner wall of said first inner cartridge.

4. The vessel of claim 1 wherein said at least two adsorption media cartridges that nest concentrically have similar diameters and stack vertically between said hollow center column and said perimeter manifold.

5. The vessel of claim 4 wherein each cartridge includes two chambers including an outer chamber adjacent to said outer wall and an inner chamber adjacent to said inner wall, and with a permeable divider therebetween.

6. The vessel of claim 5 wherein said divider is formed of coco mat material and wherein said inner wall and said outer wall are formed of perforated felt mesh.

7. The vessel of claim 1 wherein a spring plate is oriented around said hollow center column and extending perpendicular relative to said central axis of said hollow center column to an outer perimeter wall which is also perpendicular to said spring plate, said spring plate spring loaded to exert a downward force on adsorption media located within space between said hollow center column and said perimeter manifold.

8. The vessel of claim 7 wherein said spring plate includes at least one spring adjacent to an upper surface thereof, and with an inboard seal and an outboard seal on the inner and outer edges of said spring plate, said seals sliding along adjacent surfaces to contain the gas and said media below said spring plate.

9. A method for loading an adsorber vessel for an adsorption based gas separation system, the method including the steps of: placing at least two adsorption media cartridges into an adsorption vessel, the vessel having an outer containment including a sidewall, and a pair of end caps on opposite ends of the side wall, a hollow center column inboard of said sidewall and extending at least partially between the pair of end caps, a perimeter manifold closer to the sidewall than to the hollow center column, a gas inlet coupled to one of the hollow center column or the perimeter manifold, and a product gas outlet coupled to one of the perimeter manifold or the hollow center column; closing one of the end caps after said placing step; and wherein said placing step includes placing multiple separate cartridges nested concentrically between the hollow center column and the perimeter manifold.

10. The method of claim 9 wherein said multiple separate cartridges are stacked vertically, with each of the cartridges surrounding the hollow center column.

11. The method of claim 9 including the further step of retaining the media in place by placing a spring plate adjacent to uppermost portions of at least one media cartridge, the spring plate biased downward against uppermost portions of at least one media cartridge.

12. The method of claim 11 wherein said retaining step includes supporting the spring plate by including seals between an outer perimeter edge of the spring plate and portions of the vessel positioned outboard of the spring plate, the spring plate having an annular form with a hollow center surrounding said hollow center column.

13. The method of claim 9 wherein each of said cartridges contains media inboard of a perforated felt outer wall adjacent to the perimeter manifold and a perforated felt inner wall adjacent to the hollow center column.

14. The method of claim 13 wherein each of the cartridges contains two different types of media divided by a coco mat divider with a first chamber adjacent to the center column and a second chamber adjacent to the perimeter manifold.

15. The method of claim 9 wherein said placing step includes sliding the cartridges along a path parallel with a central axis of the center column into space between the center column and the perimeter manifold.

16. The method of claim 9 including a further step of locating alumina media in a first stage media cartridge adjacent to the center column, and molecular sieve media in a second stage media cartridge outboard of the first stage media cartridge and adjacent to the perimeter manifold.

17. The method of claim 9 including the further steps of:
feeding air into the vessel from a reversing blower located upstream of the center column and operating in a forward direction; and
drawing a vacuum on the vessel by the reversing blower operating in a reverse direction.

18. An adsorber vessel for an adsorption based gas separation system, the vessel comprising in combination:
an outer containment including a sidewall, and a pair of end caps on opposite ends of said side wall;
a hollow center column inboard of said sidewall and extending at least partially between said pair of end caps;
a perimeter manifold closer to said sidewall than to said hollow center column;
a gas inlet coupled to one of said hollow center column or said perimeter manifold;
a product gas outlet coupled to one of said perimeter manifold or said hollow center column;
at least one adsorption media cartridge sized to slide parallel to a central axis of said center column and into a space between said center column and said perimeter manifold to fill at least a portion of space between said hollow center column and said perimeter manifold; and
said hollow center column located downstream of a reversing blower for both pushing air into said vessel through said center column when operating in a forward direction and drawing a vacuum on said vessel through said center column when operating in a reverse direction.

19. The adsorber vessel of claim 18 wherein said cartridge includes a permeable outer wall and a permeable inner wall with adsorption media therebetween, said outer wall closer to said perimeter manifold than said inner wall;
wherein said cartridge is cylindrical in form with said outer wall forming an outer surface of said cylindrical form and with said inner wall forming an inner surface of said cylindrical form; and
wherein at least two adsorption media cartridges nest concentrically including a first inner cartridge and a second outer cartridge, said first inner cartridge nesting inboard of said second outer cartridge.

20. The adsorber vessel of claim 18 wherein at least two adsorption media cartridges nest concentrically including a first inner cartridge and a second outer cartridge, said first inner cartridge nesting inboard of said second outer cartridge.

* * * * *